UNITED STATES PATENT OFFICE.

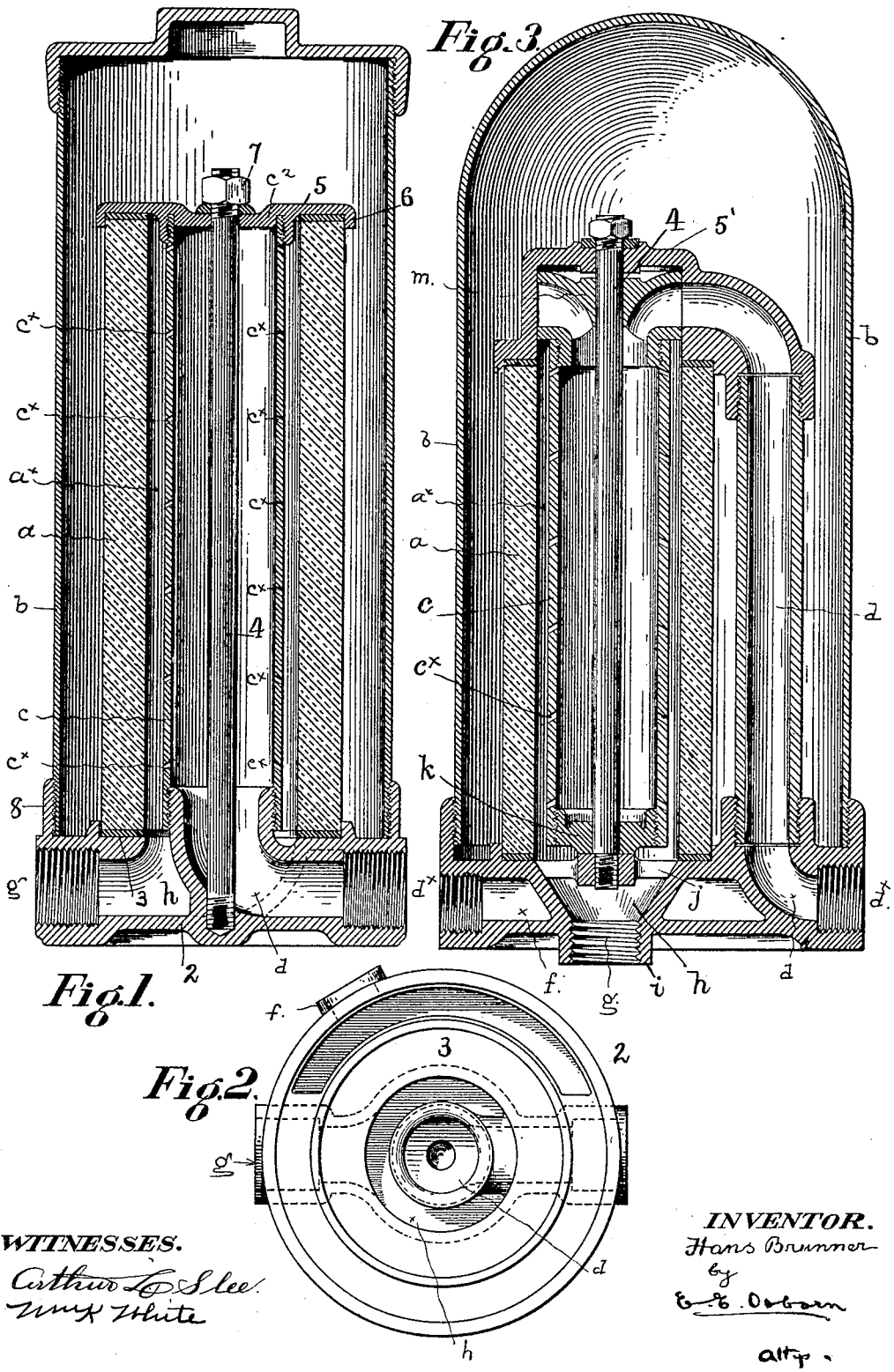

HANS BRUNNER, OF SAN FRANCISCO, CALIFORNIA.

WATER-FILTER.

No. 904,678.　　　Specification of Letters Patent.　　　Patented Nov. 24, 1908.

Application filed January 20, 1908.　Serial No. 411,790.

*To all whom it may concern:*

Be it known that I, HANS BRUNNER, a citizen of Switzerland, resident of the city and county of San Francisco and State of California, have invented new and useful Improvements in Water-Filters, of which the following is a specification.

This invention has for its object the production of an improved water-filter of that class or description in which provision is made for drawing off the water before it has passed through the filtering medium, without interrupting the filtering operation, for the purpose of furnishing water either in a filtered or an unfiltered state, as required for use.

A further object of the invention is to utilize the incoming water for a cleansing medium, to remove the coating or deposit of sediment on the surface of the filtering material, and especially to apply the water in such manner as to constantly cleanse the filtering-surface without interfering with or interrupting the filtering operation.

To these ends and objects chiefly my said invention consists in certain novel parts and combination of parts as hereinafter set forth in the following description and pointed out in the claims at the end.

The drawings accompanying and forming part of this specification illustrate two forms or constructions of my improved filter; one of which is designed for domestic purposes where the consumption of filtered water is small; and the other, for supplying filtered water in larger quantities where the consumption is greater.

Figure 1 of the drawings, represents in vertical section, a filter embodying my invention of relatively small capacity designed more especially for household use. Fig. 2 is a plan view of the supporting base of the filter. Fig. 3 is a vertical sectional view of a filter of my invention in which the water-distributing tube is rotated by the pressure of the inflowing water, for the purpose of causing the jets to wash the surface of the filtering medium.

In the drawing $a$ indicates the filtering cylinder; $b$ the surrounding casing inclosing the cylinder, and $c$ the perforated water-distributing tube. The inlet $d$ is for the unfiltered water where connection is made with a service-pipe by a coupling $d^x$; and the separate outlets $f$—$g$ at the bottom are for the filtered water and for the unfiltered water respectively.

2 indicates the base of the filter which is preferably circular in outline. It is provided with an annular seat 3 to support the filter cylinder $a$ and is provided with a flange 8 internally screw threaded to receive and support the casing $b$. A tie-rod 4 is concentrically located with reference to the filtering cylinder and the outer casing, being preferably supported in the base 2 by being screw threaded thereto as indicated in Fig. 1. A cap 5, provided with a flange 6, sits over the upper end of the filter $a$ and holds the latter in place upon its seat 3, the cap in turn being held in position by a nut 7 upon the rod 4. There is between the filter $a$ and the casing $b$ a storage space for the filtered water.

A novel feature of the water-filter of my invention consists in spraying or applying the unfiltered water in a number of jets or relatively small streams against the surface of the filtering body in such manner as to constantly wash the filtering surface for its entire length and breadth while the filtering operation is going on.

Into the hollow central space $a^x$ of the cylinder the water is conducted through the perforated tube $c$ which is so mounted or supported in the hollow center of the filtering-mass $a$ as to stand out of contact with the surrounding walls but so close thereto that the jets of water issuing from the holes $c^x$ in the tube $c$ will impinge directly upon the walls of the filter and with sufficient force to cleanse the latter, the force of the jets not being dissipated by their having to pass through a body of water of considerable thickness before reaching the walls they are to act on. At one end of the tube $c$ communicates with the inlet to which the supply-pipe for the unfiltered water is coupled—and at the opposite end $c^2$ the tube is closed. The space inclosed by the hollow filtering-mass communicates with a chamber or compartment $h$ in the bottom of the filter, where a screw-threaded socket $i$ is provided for coupling a pipe, or a faucet for drawing off the unfiltered water. The opening from the space between the tube $c$ and the inner wall of the filter into the chamber $h$ is substantially co-extensive with the cross area of such space, so that the sediment washed down from the filtering surface readily passes into the chamber $h$, which serves as a sort of collecting pocket, and there is no place for lodgment of the sediment between the said water space and collecting chamber or compartment.

Apertures $c^x$ in the tube are arranged at intervals apart around the circumference and from end to end of the tube, preferably in a slanting direction downward, by virtue of which the jets will impinge upon the surrounding walls at an angle, and so wash and continually cleanse the filtering-surface from the top to the bottom. The perforations are suitably arranged for that purpose at intervals apart circumferentially and also longitudinally of the tube from top to bottom.

In the form or construction of this filter which I have shown in Fig. 1, the water-distributing tube is immovably fixed within the hollow space of the filtering-mass, and the apertures $c^x$ for the jets are arranged so as to reach and wash down the entire filtering-surface. Whereas in the construction illustrated in Fig. 3, the tube $c$ is mounted for rotation in the inclosed filtering-space, and is fixed to or connected with a small turbine wheel $m$. Fixed to the base of the filter and located directly above the collecting chamber or compartment $h$ is a spider-like support $j$ for the tie-rod 4, the upper end of which passes through the cap 5' that engages with and holds in place the upper end of the filter $a$. Loosely supported upon the rod 4 and resting upon the spider-like support $j$ is a disk or head $k$ to which the lower end of the tube $c$ is secured preferably by having a screw threaded connection therewith. The upper end of this tube is connected with the turbine wheel $m$ which is also loosely supported upon the rod 4 and is located within a chamber formed therefor in the cap 5'. The buckets of the turbine or water wheel $m$ are located opposite the inlet delivery port of the supply pipe $d$, this pipe, in this form of the invention, delivering to the filter at its upper end. By this means the tube is caused to revolve and is kept in motion by the head or pressure of the in-coming water, with the effect to project the jets through the body of water in the surrounding space with sufficient force to strike and wash down the walls of the filtering medium. A revolving tube driven in this manner is substituted for the stationary tube in a filter of the larger size or capacity, wherein the space inclosed by the filtering-mass and in which the tube is inclosed, is of such capacity that the larger body of water situated between the tube and the surrounding walls will be better penetrated by the jets, and they will act more effectively to wash down the walls, than where the jets act on the walls through the head or pressure of the incoming water without the centrifugal motion. In a filter of small capacity, where the filtering space is of comparatively small area and the surrounding walls are in close relation to the tube, the jets will ordinarily be projected through the confined body of water by the head or pressure alone with sufficient force to clean the filtering-surface; and in that event, the stationary, or non-rotating, distributing tube can be used with the advantage of reducing the cost of construction.

It will be understood that the cocks or faucets are to be provided on the inlet-pipe for the unfiltered water and upon the pipes which are coupled to the outlets for the filtered-water leading from the space in the inclosing case, and for the outlet from the space in which the perforated distributing tube operates. Such arrangement of outlets and faucets permits the water to be drawn directly through the apparatus without being filtered, as well as for frequently blowing off or cleansing the filtering chamber.

What I claim as my invention is:

1. A filtering device having a circular base provided with an annular seat for a filtering cylinder, a filtering cylinder seated therein, a cap adapted to close the top of the cylinder and provided with a flange to fit on the cylinder and a tie-rod extending through the central hollow space of the cylinder, and adapted to draw the cap against the cylinder; a distributing-tube supported from the cap in the central hollow space clear of the surrounding walls, and a tubular coupling in the center of the base connecting the lower end of the distributing-tube with an inlet in the side of the base, and a casing surrounding the filtering cylinder adapted to inclose a storage-space for the filtered liquid, the said base having an outlet communicating with the storage-space in the casing.

2. In a water filter, the combination of a filter-body having a hollow central space into which the unfiltered water is delivered, a water-tight case inclosing a storage space outside the filter for the filtered water, a water distributing tube located in the space within the filter-body and standing clear of the walls thereof, and a base having a sediment-collecting chamber located below the space between the distributing tube and the inner surface of the filter, the opening into the said chamber being substantially co-extensive with the cross area of the space between the said tube and filter, substantially as set forth.

In witness that I claim the foregoing, I sign my name in the presence of two witnesses.

HANS BRUNNER.

Witnesses:
E. E. OSBORN,
P. S. PIDWELL.